(12) United States Patent
Matsushita et al.

(10) Patent No.: US 8,708,502 B2
(45) Date of Patent: Apr. 29, 2014

(54) PROJECTION TYPE IMAGE DISPLAY APPARATUS WITH SHIELDED CIRCUIT BOARD

(75) Inventors: Junko Matsushita, Osaka (JP); Shunsuke Okamoto, Kyoto (JP); Takanobu Taniyama, Osaka (JP); Masanori Goto, Shiga (JP); Tomohiro Murota, Osaka (JP)

(73) Assignee: Panasonic Corporation, Osaka (JP)

( * ) Notice: Subject to any disclaimer, the term of this patent is extended or adjusted under 35 U.S.C. 154(b) by 244 days.

(21) Appl. No.: 13/128,784

(22) PCT Filed: Nov. 30, 2009

(86) PCT No.: PCT/JP2009/006474
§ 371 (c)(1),
(2), (4) Date: May 11, 2011

(87) PCT Pub. No.: WO2010/064397
PCT Pub. Date: Jun. 10, 2010

(65) Prior Publication Data
US 2011/0216291 A1 Sep. 8, 2011

(30) Foreign Application Priority Data
Dec. 1, 2008 (JP) ................................. 2008-305986

(51) Int. Cl.
*G03B 21/14* (2006.01)
(52) U.S. Cl.
USPC ........................................................ 353/119
(58) Field of Classification Search
USPC ........................................................ 353/119
See application file for complete search history.

(56) References Cited

U.S. PATENT DOCUMENTS

| 6,555,761 | B2 * | 4/2003 | Amir .............................. 174/263 |
| 2001/0046813 | A1 * | 11/2001 | Greenside et al. ............ 439/625 |
| 2002/0021415 | A1 | 2/2002 | Fujimori et al. |
| 2003/0174288 | A1 * | 9/2003 | Nakano ........................... 353/31 |
| 2005/0060734 | A1 * | 3/2005 | Aoyama et al. ................ 720/706 |
| 2008/0037277 | A1 * | 2/2008 | Yamaguchi et al. .......... 362/611 |
| 2008/0316720 | A1 * | 12/2008 | Maeno .......................... 361/757 |

FOREIGN PATENT DOCUMENTS

| JP | 01-171992 | 7/1989 |
| JP | 04-372205 | 12/1992 |
| JP | 10-186513 | 7/1998 |
| JP | 2006-100521 | 4/2006 |
| JP | 2007-214011 | 8/2007 |

\* cited by examiner

*Primary Examiner* — Thanh Luu
*Assistant Examiner* — Renee Naphas
(74) *Attorney, Agent, or Firm* — Hamre, Schumann, Mueller & Larson, P.C.

(57) ABSTRACT

The projection type image display apparatus is equipped with a lamp unit (22), an optical block (21) which modulates light from the lamp unit and projects an image signal, a circuit board (24) having via holes and on which an external connector (25) is mounted, and a cabinet (2) for housing the aforementioned elements. The display apparatus is equipped with a back cover (26) provided to cover around the external connector from the outside and a dustproof cover (29) provided to cover around the external connector from the inside. A closed space is formed by the circuit board, the back cover (26) and the dustproof cover (29), and the dustproof cover closely shields at least a space below the circuit board from the exterior. Excellent dustproof characteristics enabling use even in installation environments with a large amount of dust and dirt can be obtained.

5 Claims, 11 Drawing Sheets

PROJECTION TYPE IMAGE DISPLAY APPARATUS WITH SHIELDED CIRCUIT BOARD

TECHNICAL FIELD

The present invention relates to a projection type image display apparatus, and particularly, a multipurpose projection type image display apparatus that can be used in a severe environment subjected to a dust and dirt.

BACKGROUND ART

Recently, projection type image display apparatuses (hereinafter, described also as projectors) have been widespread, and such projection type image display apparatuses often have been used in various locations indoors and outdoors, in addition to the conventional application in an environment with relatively clean air, such as a meeting room of an enterprise. The increased scope of the use location results in variation in the use environments, and thus the conditions for temperature, humidity and air cleanliness become more severe. As a result, with the expanding use, new problems have occurred with respect to the quality of the projector.

In particular, when the projection type image display apparatus is used in an environment with an inferior air cleanliness, dust and dirt enter the interior of the cabinet of the projector and adhere to elements and components of the optical system, thereby degrading drastically the illuminance of the projector. For solving the problem, a dustproof measure for a projector is an urgent and important technical object.

For a conventional dustproof measure in a projection type image display apparatus, an air filter is provided at an opening, and concurrently, a wall is provided on the interior of the display apparatus so as to configure a dustproof space in which optical components (prism unit) are housed (see Patent Document 1 for example). In this example, a buffer material as a dustproof member is inserted in the clearance of a dustproof space.

Dustproof measures for circuit boards are disclosed in Patent Documents 2 and 3, for example. The methods include: filling through holes of a printed wiring board for IC cards with plated metal so as to prevent dust and dirt from entering the substrate at the side where electronic components are mounted; or attaching a shield case to a substrate, thereby enveloping the substrate with the shield case and a metal case so as to prevent adherence of dust.

PRIOR ART DOCUMENT

Patent Documents

Patent document 1: JP H10-186513 A
Patent document 2: JP H01-171992 A
Patent document 3: JP H04-372205 A

DISCLOSURE OF INVENTION

Problem to be Solved by the Invention

However, the conventional measures as described above were insufficient for dustproof of a general-purpose projector to be used under an environment with a large amount of dust and dirt. In particular, the conventional method of taking dustproof measures with respect to some partial areas inside a projection type image display apparatus is insufficient to prevent dust and dirt from entering the interior of the display apparatus. Therefore, in a case of using the display apparatus in an environment with a large amount of dust and dirt, the circuit board and the other elements and components may be affected seriously, which results in problems for the display apparatus, such as degradation of function, failures, degradation in the durability and the like.

As mentioned above, there has not been any example of clarifying dustproof characteristics required for the respective areas of the display apparatus so as to take a comprehensive dustproof measure.

Therefore, with the foregoing in mind, it is an object of the present invention to provide a projection type image display apparatus configured to take comprehensive dustproof measures corresponding to the dustproof characteristics required for the respective areas of the display apparatus, and thus can be installed in environments with various levels of dust and dirt indoors and outdoors.

Means for Solving Problem

For achieving the above-described object, a projection type image display apparatus of the present invention includes: a light source; an optical component that modulates light coming from the light source and projects an image signal; a circuit board formed with via holes, on which an external connector is mounted; and a cabinet for housing these components. The projection type image display apparatus includes further a connector cover provided to cover around the external connector from the outside, and a dustproof cover provided to cover around the external connector from the inside. A closed space is formed by the circuit board, the connector cover and the dustproof cover, and the dustproof cover hermitically shields to at least the space below the circuit board from the exterior.

Effects of the Invention

The projection type image display apparatus of the present invention is capable of preventing effectively dust and dirt from entering through the clearance between the connector cover and the external connector and also through the pinholes formed on the external connector. Further, a comprehensive dustproof measure is taken, particularly for the area for providing the external connector that is susceptible to entrance of dust and dirt. Therefore, the weather durability of the projection type image display apparatus can be improved suitably and effectively, and thus a convenient projection type image display apparatus, which can be installed in environments with various levels of dust and dirt indoors and outdoors, can be provided.

DESCRIPTION OF THE INVENTION

A projection type image display apparatus of the present invention can be modified as described below without departing from the above-described configurations.

That is, as a preferred configuration, an elastic dustproof sheet is provided further between the circuit board and the outer cover that composes a part of the cabinet and that covers the circuit board, for the purpose of shielding through holes other than the via holes on the circuit board and shielding the clearance between the circuit board and the connector cover.

With this configuration, it is possible to prevent effectively entrance of dust and dirt from the through holes such as attachment holes other than the via holes on the circuit board and from the clearance between the circuit board and the connector cover.

It is further preferable that the via holes formed in an area of the circuit board corresponding to the closed space are clogged.

The configuration effectively serves to prevent the entrance of dust and dirt from the via holes. Further, since there is no necessity of covering the via holes with the dustproof sheet, the surface area of the dustproof sheet can be decreased.

The dustproof cover can be formed of a resin material. By use of the resin dustproof cover, the shape of the dustproof member can be optimized easily.

Further, the circuit board can be configured with dogged via holes as a result of solder application conducted using a solder application mask having a pattern of the solder application including the position of the via holes.

According to the configuration, the via holes can be clogged in a simple manner.

Hereinafter, a preferred embodiment of the present invention will be specified with reference to the attached drawings.

Embodiment

Figure 1:
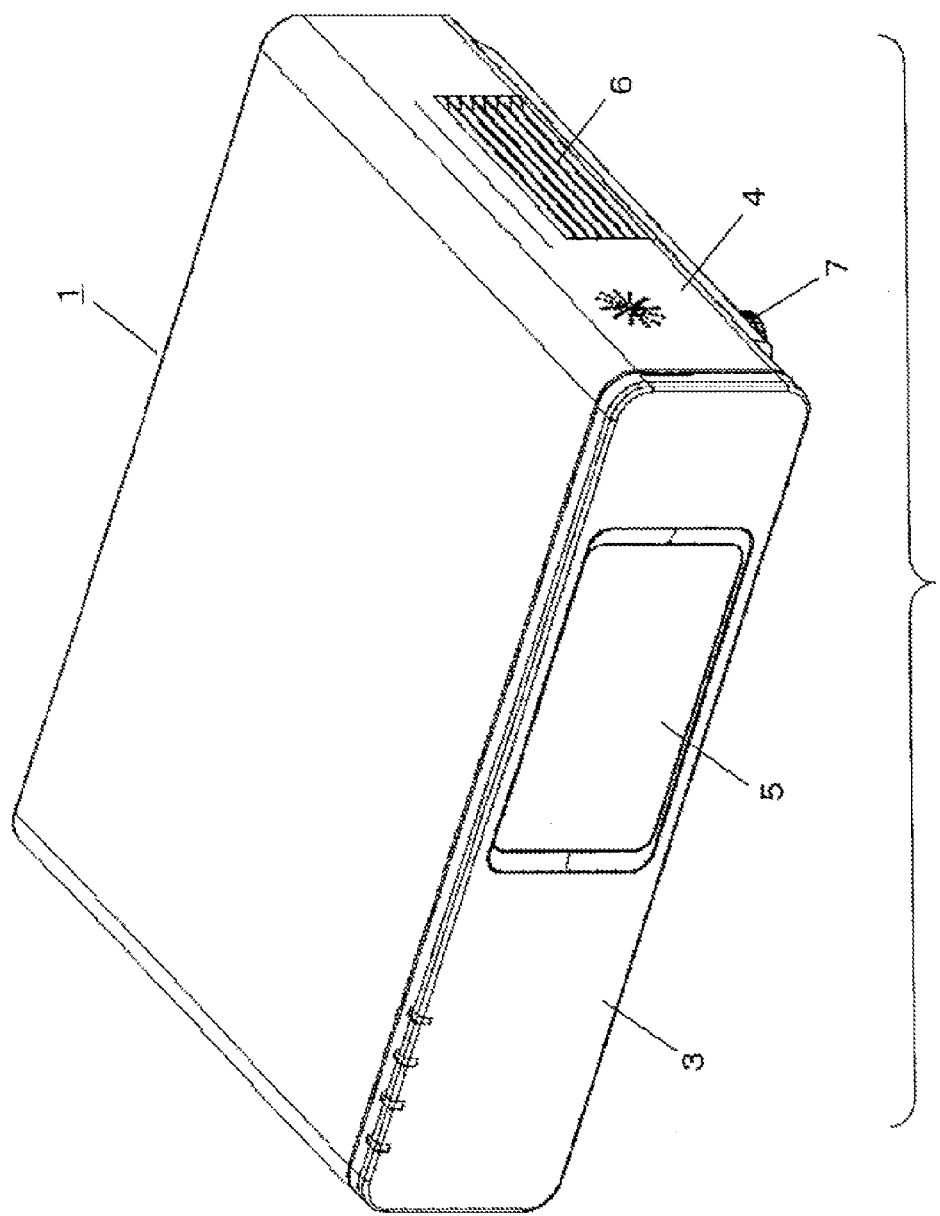
FIG. 1 is a perspective view showing an appearance of a projection type image display apparatus according to an embodiment of the present invention.
Figure 2:
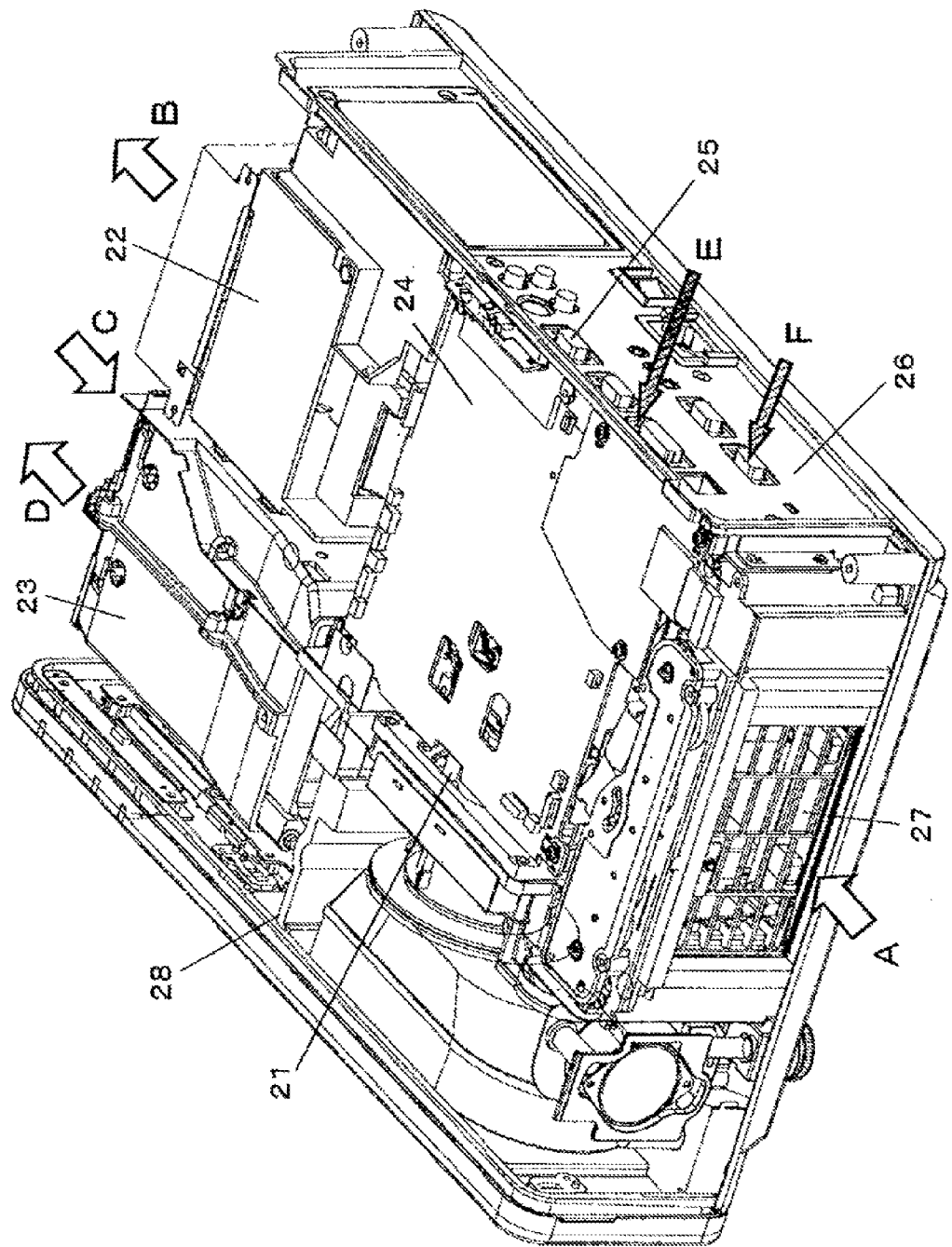
FIG. 2 is a perspective view showing main components and the arrangement inside the display apparatus.

The basic configuration and the function of the image display apparatus according to an embodiment of the present invention will be described below with reference to FIGS. 1 and 2. FIG. 1 is a perspective view showing an appearance of a projection type image display apparatus (hereinafter, this will be described as the apparatus) 1 according to the present embodiment. FIG. 2 is a perspective view showing main components and the arrangement inside the apparatus 1.

In the apparatus 1, a projection type projector unit (not shown, hereinafter, this will be described simply as projector) is housed in a cabinet 2. The cabinet 2 includes a front panel 3, an outer cover 4 and a bottom plate (not shown). A projection window 5 for the projector is formed on the front panel 3, air vents 6 are formed on the side faces, and legs 7 are provided to the bottom face. The projector has a capability of projecting an image of a certain dimension and a certain illuminance from a certain projection distance. By projecting image information outputted by the projector on a screen (not shown) through the projection window 5, an image can be displayed at a large scale. It should be noted that the projector can be connected to an information processing device such as a personal computer (not shown), thereby storing information necessary for information delivery service, or acquiring information from the exterior through a communication line.

Figure 3:
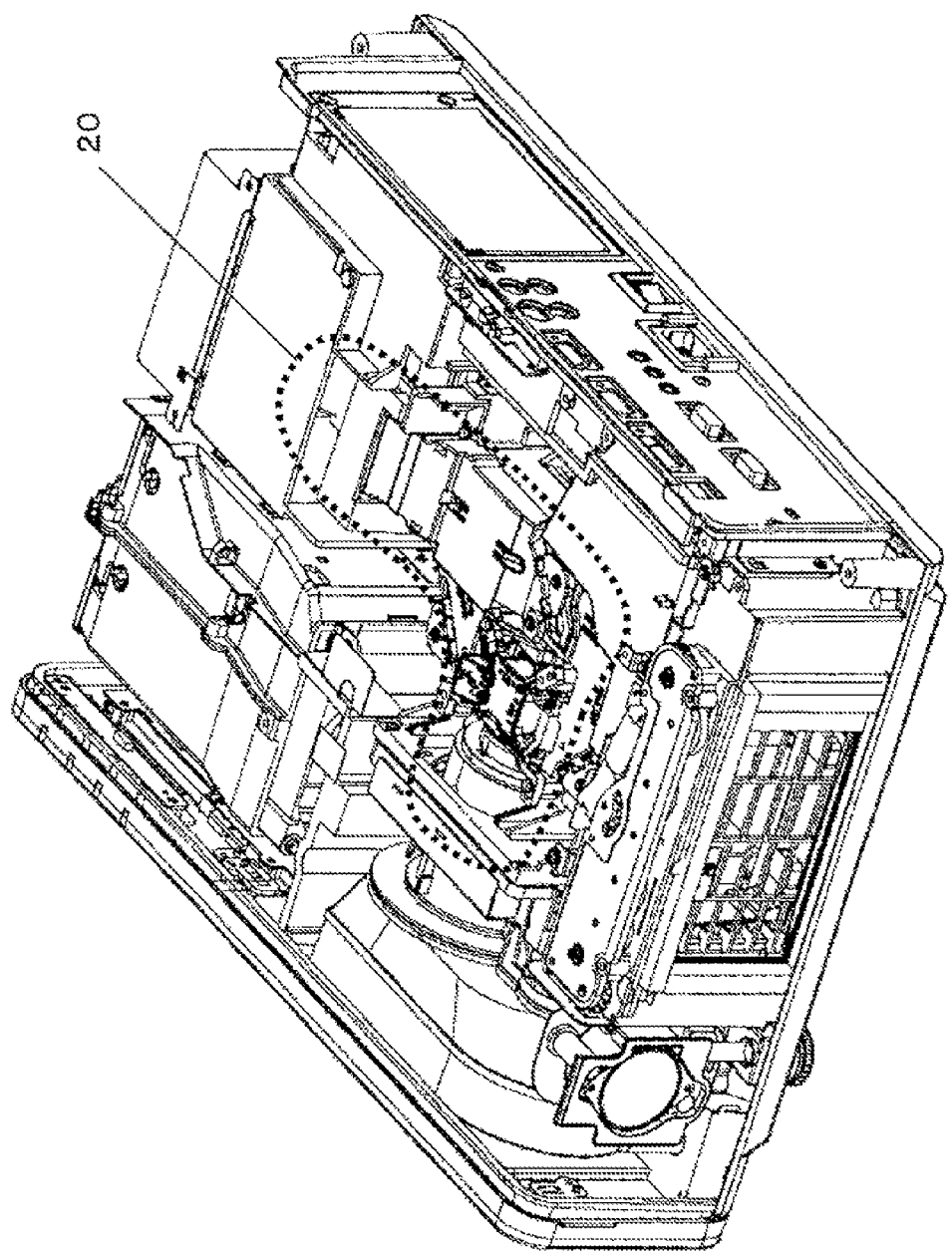
FIG. 3 is a perspective view showing an optical block area of the display apparatus.

The main configuration inside the apparatus 1 will be described below with reference to FIGS. 2 and 3.

As shown in FIG. 2, a lamp unit 22, a power source unit 23, a circuit board 24 and an optical block 21 disposed below the circuit board 24 are housed as a projector unit inside the cabinet 2 of the apparatus 1. FIG. 3 shows the projector unit from which the circuit board 24 in FIG. 2 has been removed. An area enclosed by a dotted line 20 indicates the optical block 21, and the area includes optical components such as a condensing lens, a prism, a liquid crystal display element and a projection lens. When dust and dirt enter this area, the dust and dirt will adhere to the optical components, thereby degrading drastically the illuminance of the projector. For this reason, a special emphasis is placed on measures for protecting this area from dust and dirt.

As shown in FIG. 2, an external connector (hereinafter, this will be described simply as connector) 25 is mounted on the circuit board 24. The connector 25 is disposed on the back face of the apparatus 1, on which a back cover 26 as a connector cover is disposed to cover from the outside.

Further, two air routes are provided to the apparatus 1. A first air route is a path for cooling the optical block 21 and the lamp unit 22. Namely, an intake A is conducted by a fan (not shown) from an air intake port 27 provided on a side face. The air flow passes between the circuit board 24 and the bottom plate and an exhaust B is conducted from an exhaust port (not shown) formed on the other side face. A second air route is a path for cooling the power source unit 23. An air intake port and an exhaust port (either not shown) are formed on either of the side faces, for conducting an intake C and an exhaust D.

On the air intake port 27 of the display apparatus 1, a dustproof filter (not shown) is disposed in an exchangeable manner. Such a dustproof filter is not disposed at the air intake port (not shown) for the air intake C, since there is a necessity of reducing air resistance and feeding as much air as possible to the power source unit 23 for the purpose of cooling. Instead, a partition board 28 serves to prevent dust and dirt from entering the optical block 21. Since the exhaust ports exhaust dust and dirt during operations of the display apparatus 1, such a dustproof filter is not an essential element. However, by providing the dustproof filter also at the exhaust port, the dustproof system at the air intake ports and the exhaust ports will be more reliable. All of the openings except for the air intake ports and the exhaust ports formed on the outer cover 4 are provided with a dustproof member.

Next, the dustproof structure on the back face, which characterizes the configuration of the display apparatus 1, will be described.

As shown in FIG. 2, the connector 25 mounted on the circuit board 24 is exposed on the back face of the display apparatus 1. This structure may permit the entrance of dust and dirt from the clearance (part E) between the back cover 26 and the connector 25. Further, each pinhole (not shown) of the connector 25 forms a via hole opening (part F), through which dust and dirt may enter. In light of preventing the entrance of dust and dirt through these parts on the back face, the display apparatus 1 is configured to have a dustproof system.

Hereinafter, the dustproof structures on the back face of the display apparatus 1 will be specified with reference to FIGS. 4 to 9.

Figure 4:
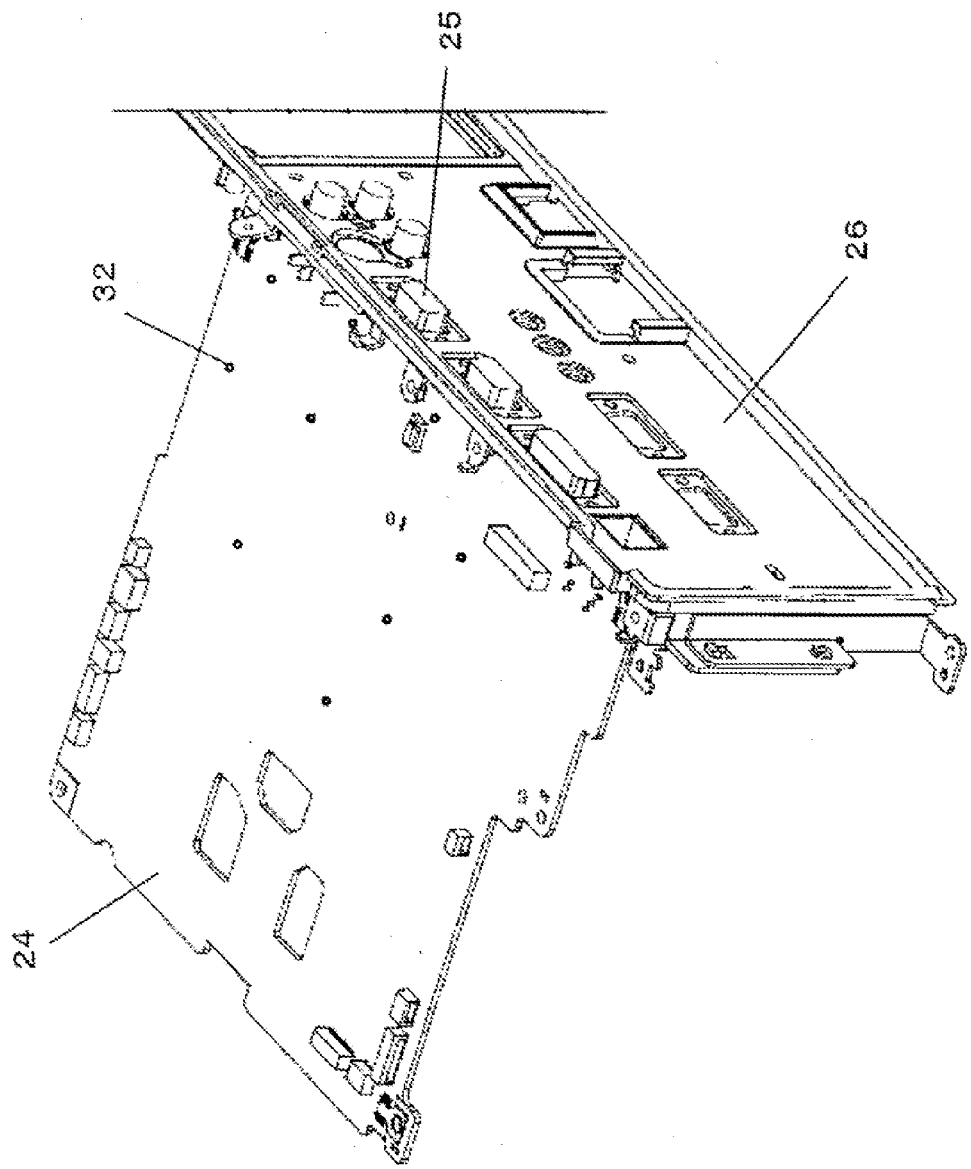
FIG. 4 is a perspective view showing a configuration of a circuit board unit of the display apparatus.
Figure 5:
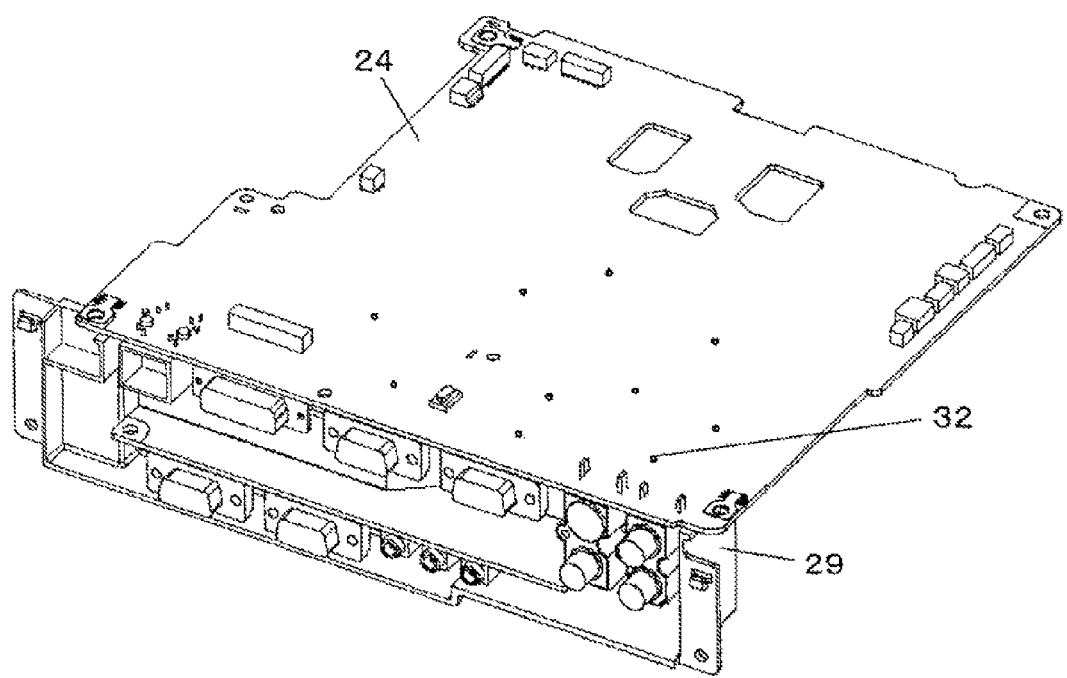
FIG. 5 is a perspective view showing a configuration of a circuit board unit of the display apparatus.
Figure 6:
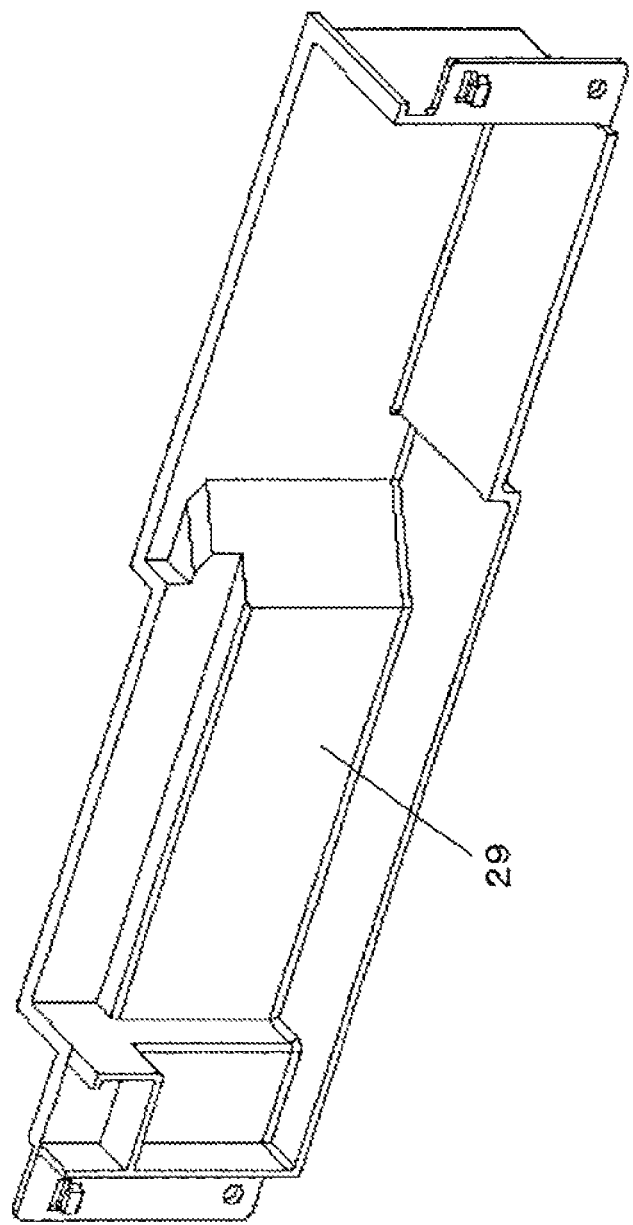
FIG. 6 is a perspective view showing a shape of a dustproof cover included in the circuit board unit of the display apparatus.

FIGS. 4 and 5 are perspective views showing the configuration of a circuit board unit. As shown in FIG. 4, the connector 25 is mounted on the circuit board 24, and a back cover 26 is attached for covering the connecter 25 from the outside. FIG. 5 shows the circuit board unit from which the back cover 26 as shown in FIG. 4 has been removed. In the circuit board unit, a resin dustproof cover 29 is provided as a dustproof outer component on the inner surface of the back cover 26. FIG. 6 is a perspective view showing the shape of the dustproof cover 29.

The dustproof cover 29 covers around the backside of the connector 25 in the space below the circuit board 24, and the upper end part is in close contact with the circuit board 24. The back face cover 26, the circuit board 24 and the dustproof cover 29 form a closed space for blocking the area communicating with the space below the circuit board 24 from outside the cabinet 2, thereby preventing entrance of dust and dirt. It should be noted that the closed space is not necessarily a hermetically-shielded space but a space substantially shielded from the exterior though including some leakages as the parts indicated with the arrows E and F in FIG. 2. However, the dustproof cover 29 hermetically shields at least the space below the circuit board 24 from the exterior, thereby preventing entrance of dust and dirt via the space below the circuit board 24.

On the circuit board 24, a number of via holes 32 that penetrate the substrate are formed. Each of the via holes 32 is plated with a conductive material on the inner surface in order to connect electrically the surface and the back face of the circuit board 24, thereby making the wiring pattern on the back face of the package face available. When the packaging density of the components is raised further, the packaging surface and the back face alone will be insufficient for ensuring the area for the wiring pattern. In such a case, the circuit board 24 is made as a multilayer, and a power source layer, a ground layer and a wiring layer are formed on the inner layer. And by the interlayer connection with the via holes 32, high-density packaging on the circuit board 24 can be provided. As described below, the via holes 32 need a dustproof system.

As mentioned above, the thus provided dustproof cover 29 can block dust and dirt entering from the clearance between the back cover 26 and the connector 25 (FIG. 2, arrow E) and from the pinhole (FIG. 2, arrow F) of the connector 25.

Figure 7:
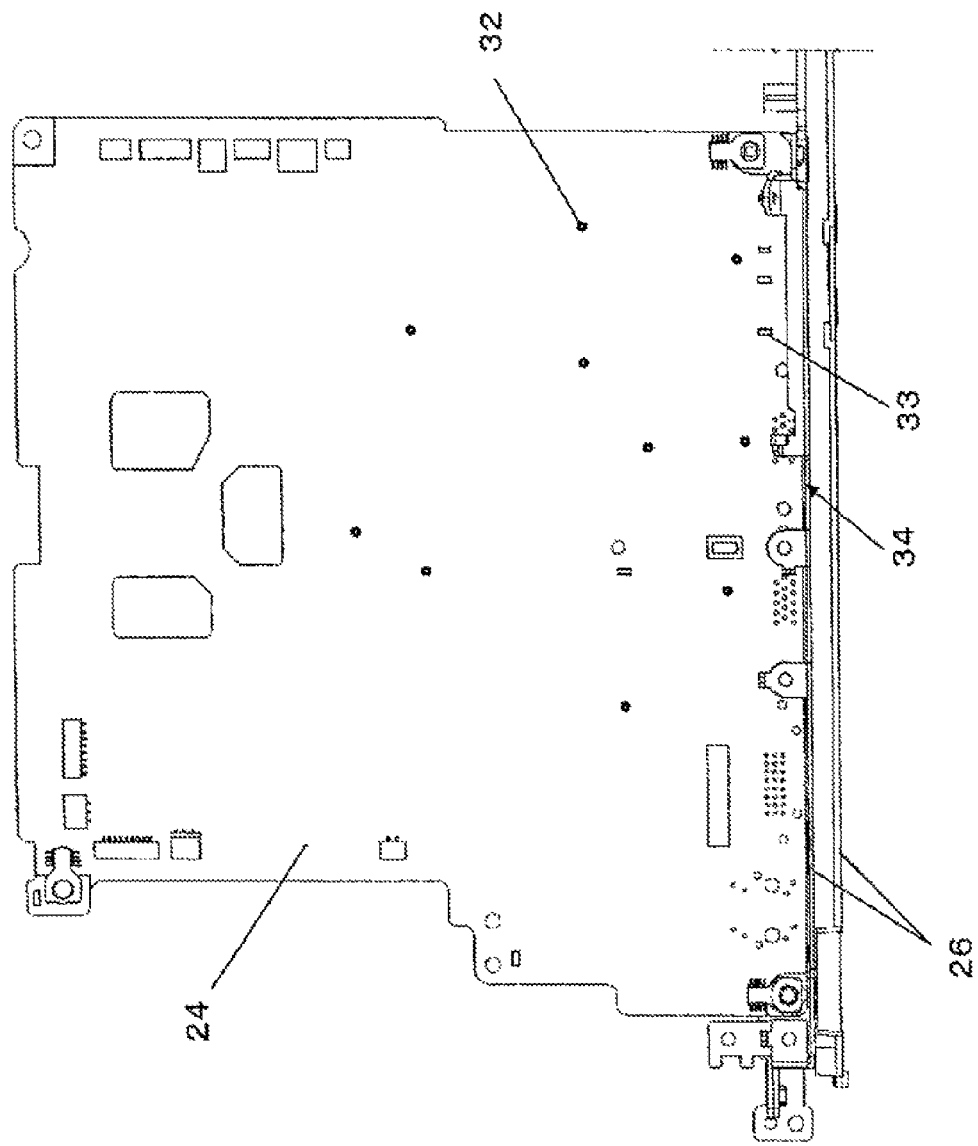
FIG. 7 is a plan view showing the upper side of the circuit board unit of the display apparatus.

However, it is preferable to provide an additional dustproof structure. Namely, as shown in FIG. 7 of a top plan view of the circuit board unit, not only the via holes 32 but attachment holes 33 for attaching the connector 25 and other components are formed on the circuit board 24. Further, there is a small clearance 34 between the circuit board 24 and the back cover 26. Dust and dirt that are blocked by the dustproof cover 29 so as not to enter the space below the circuit board 24 may enter above the circuit board 24 through the attachment holes 33 and the clearance 34 so as to reach the optical block 21.

Figure 8:
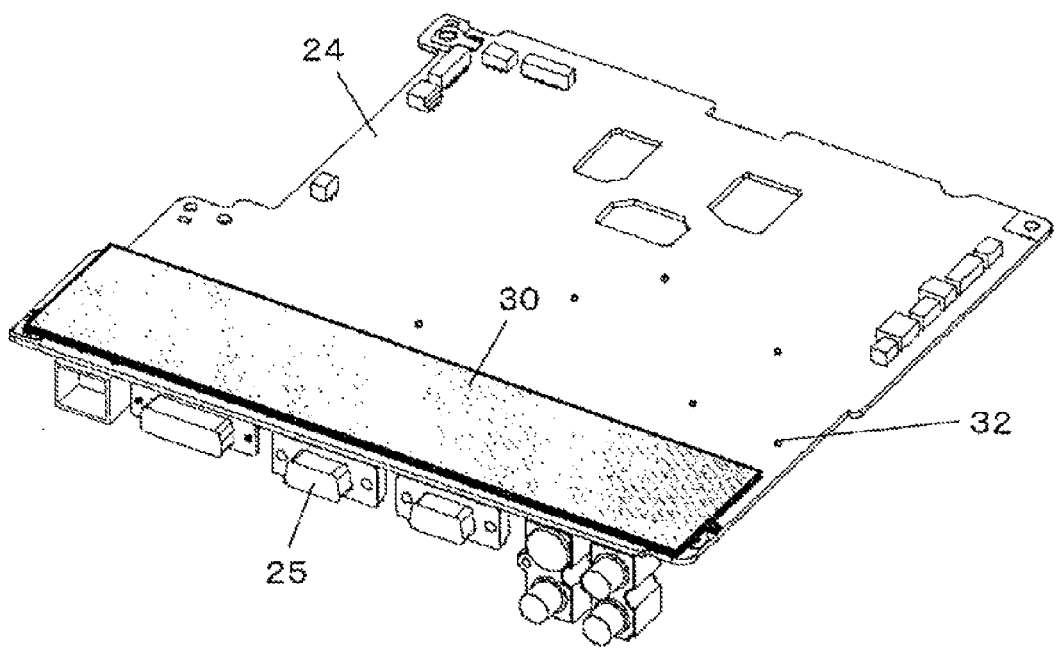
FIG. 8 is a perspective view showing a dustproof structure on the back face of the display apparatus.
Figure 9:
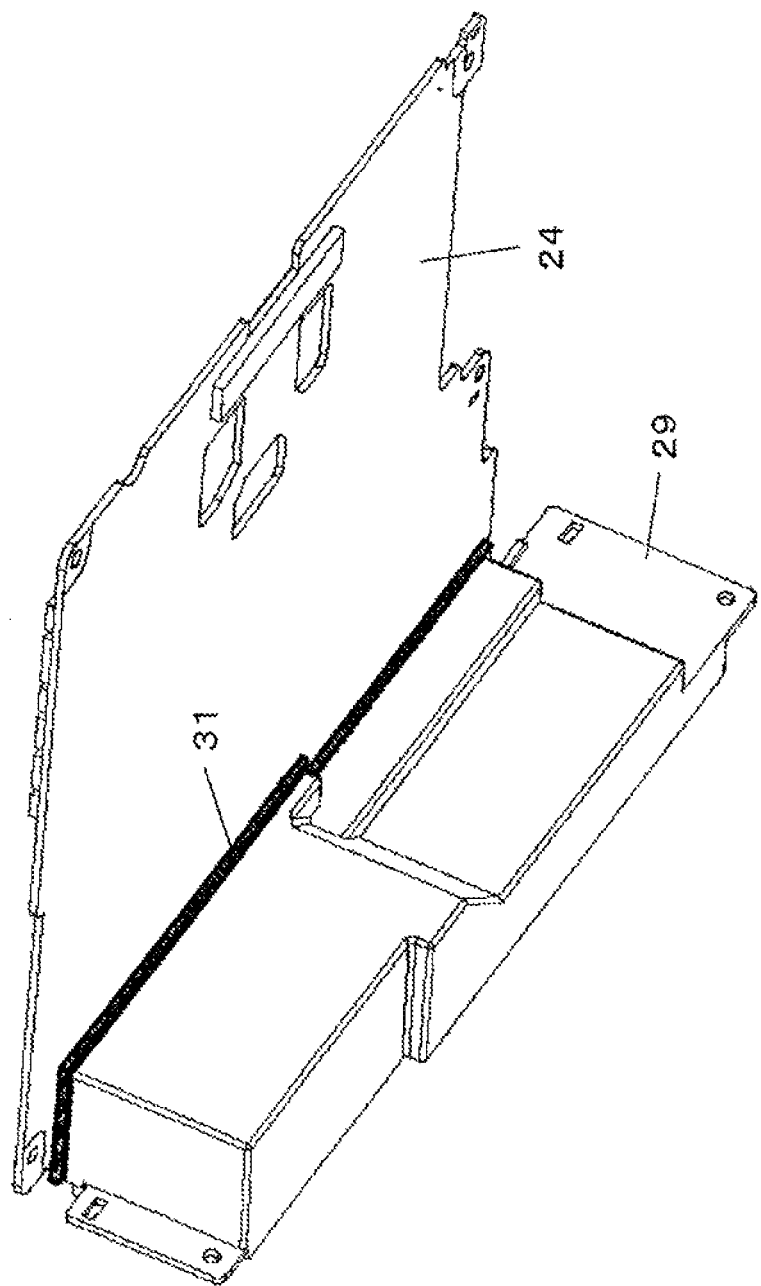
FIG. 9 is a perspective view showing a dustproof structure at another location on the back face of the display apparatus.

In view of this problem, as shown in FIG. 8 the display apparatus 1 has further an elastic dustproof sheet 30 interposed between the circuit board 24 and the outer cover 4. Further, as shown in FIG. 9, a dustproof member 31 is inserted between the circuit board 24 and the dustproof cover 29 to fill the clearance between the joint surfaces.

In addition, in the display apparatus 1, among the via holes 32 formed on the circuit board 24, at least all of the via holes in an area surrounded by the dustproof cover 29 are clogged. Here, the via hole in the area surrounded by the dustproof cover 29 denotes the via hole formed in the area closer to the connector 25 in comparison with the position at which the upper end of the dustproof cover 29 contacts. When the via holes are clogged in this manner, the surface area of the dustproof sheet 30 can be decreased in comparison with a case where the via holes are not clogged, and thus the cost for the components can be reduced.

Figure 10A:
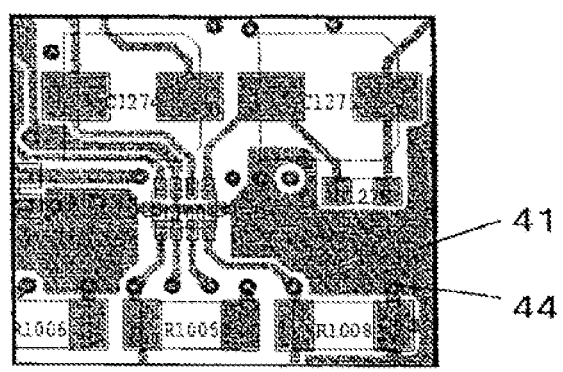
FIG. 10A is a plan view showing an example of a printed wiring board as the circuit board of the display apparatus.
Figure 10B:
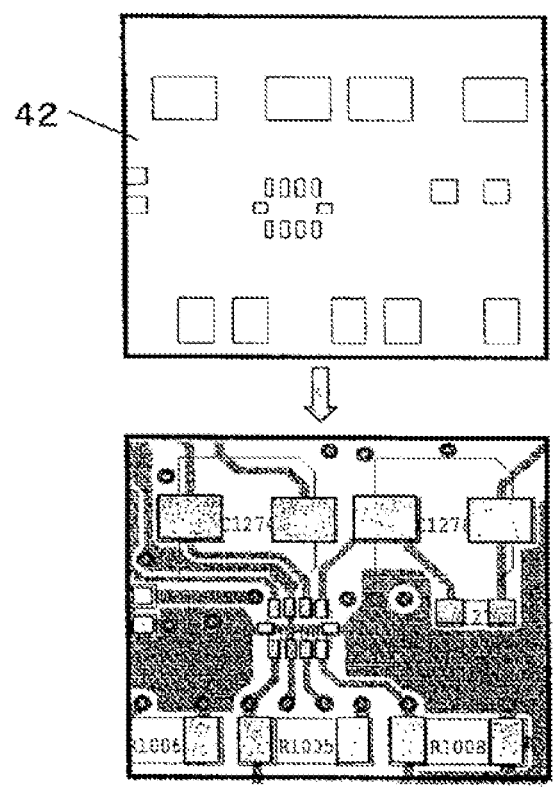
FIG. 10B is a plan view for explaining a process of forming via holes on a circuit board by using an ordinary metal mask.
Figure 10C:
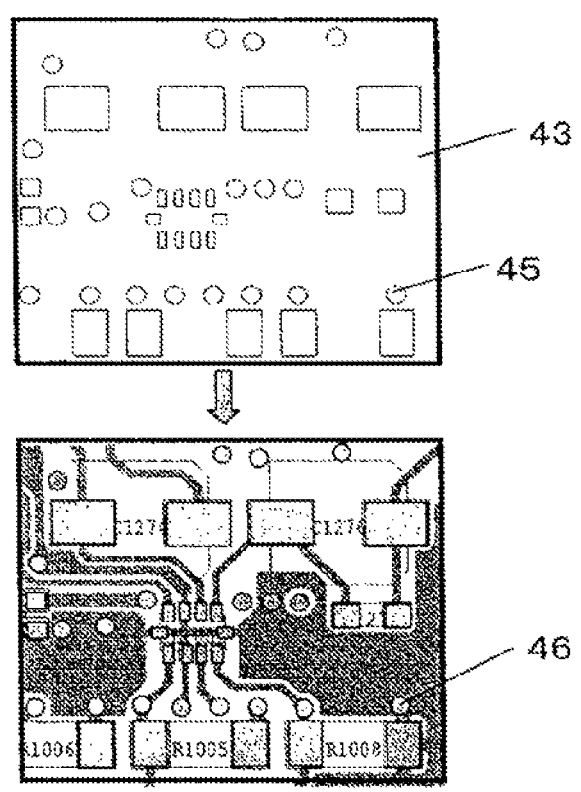
FIG. 10C is a plan view for explaining a process of clogging via holes on a circuit board in an embodiment of the present invention.

An example of a process for clogging the via holes 32 on the circuit board 24 will be described below. In the case of the display apparatus 1, a solder application mask used to process the circuit board 24 (hereinafter, this will be described as metal mask) has a pattern for solder application including the positions of the via holes to be formed on the circuit board 24. Thereby, the via holes 32 on the circuit board 24 can be clogged during the process of solder application. FIGS. 10A-10C show a process of clogging the via holes 32 on the circuit board 24.

FIG. 10A is a plan view showing an example of a printed wiring board 41, where via holes 44 are formed. FIG. 10B shows a process of forming via holes by use of an ordinary metal mask 42 at the time of soldering the printed wiring board 41. FIG. 10C shows a process of soldering by use of a metal mask 43 prepared for clogging the via holes, during production of the apparatus 1.

For clogging the via holes 44 for example, openings 45 are formed on the metal mask 43 as shown in FIG. 10C at positions corresponding to the via holes 44 so as to form clogged via holes 46. In this manner, the via holes formed at arbitrary positions on the circuit board 24 can be clogged by use of the metal mask 43, and thus the via holes can be clogged in a simple manner.

As described above, the display apparatus 1 has a dustproof filter at openings formed on the outer cover 4, and furthermore, a dustproof cover 29 on the inner surface of the back cover 26, and an elastic dustproof sheet 30 interposed between the circuit board 24 and the outer cover 4. In the display apparatus 1, among the via holes 32 on the circuit board 24, the via holes in an area surrounded by the dustproof cover 29 are clogged.

The above-described configuration serves to dustproof measures for the back face of the display apparatus 1 on which the connector 25 is mounted, and the configuration is effective in preventing entrance of dust and dirt from the position at which the connector is provided, such as the pinholes at the terminal of the connector and the clearance between the connector and the outer cover. Therefore, it is possible to have comprehensive and effective dustproof measures, and the entrance of dust and dirt inside the display apparatus can be prevented reliably. As a result, a projection type image display apparatus that can be installed in any environments with various levels of dust and dirt level indoors and outdoors can be provided. Furthermore, the numbers of components, the numbers of process steps and the numbers of repairs can be decreased to improve the cost effect.

Though the above-described embodiment refers to an example where the connector 25 is provided on the back face, the configuration of the present embodiment can be applied similarly to a case where the connector 25 is provided not on the back face but on a side face or the like.

INDUSTRIAL APPLICABILITY

The present invention can provide a projection type image display apparatus with excellent dustproof performance. Such a projection type image display apparatus can be used preferably in installation environments with a large amount of dust and dirt indoors and outdoors.

EXPLANATION OF LETTERS AND NUMERALS

1 Projection type image display apparatus (the apparatus)
2 Cabinet
3 Front panel
4 Outer cover
5 Projection window
6 Air vent
7 Leg
20 Optical block area
21 Optical block
22 Lamp unit
23 Power source unit
24,41 Circuit board
25 External connector (connector)
26 Back cover (connector cover)
27 Air intake port
28 Partition panel
29 Dustproof cover
30 Dustproof sheet
31 Dustproof member
32,44 Via hole
33 Attachment hole
34 Clearance
41 Printed wiring board
42,43 Solder application mask (metal mask)
45 Opening for solder application
46 Clogged via hole

The invention claimed is:

1. A projection type image display apparatus comprising a light source, an optical component that modulates light from the light source and projects an image signal, a circuit board that has via holes and on which a plurality of external connectors are mounted, and a cabinet that houses the aforementioned elements;

the projection type image display apparatus further comprising a single connector cover provided to cover the plurality of external connectors so that a tip end part of each of the external connectors is exposed respectively to the outside, and a single dustproof cover provided for the external connectors opposing the connector cover, the dustproof cover having a base member from which a solid peripheral wall extends, the base member having a peripheral portion where the peripheral wall is not present that defines a first edge, the peripheral wall defining a second edge in a plane that is spaced from the base member and third and fourth edges that extend between the first edge and the second edge, the second edge engaging the circuit board, and the first, third and fourth edges engaging the connector cover to define a closed space enclosing the plurality of external connectors, whereby dust and dirt entered from a clearance between the tip end part of each of the external connectors and the connector cover are prevented from further entering into an area of the optical component by the presence of the closed space.

2. The projection type image display apparatus according to claim 1, further comprising an elastic dustproof sheet provided between the circuit board and an outer cover that composes a part of the cabinet so as to cover the circuit board, for shielding through holes other than the via holes on the circuit board and for shielding a clearance between the circuit board and the connector cover.

3. The projection type image display apparatus according to claim 1, wherein the via holes formed on the circuit board in an area corresponding to the closed space are clogged.

4. The projection type image display apparatus according to claim 1, wherein the dustproof cover is formed of a resin material.

5. The projection type image display apparatus according to claim 1, wherein the via holes are clogged by solder application conducted using a solder application mask having a pattern for the solder application including positions of the via holes.

* * * * *